United States Patent [19]

Knight

[11] Patent Number: 5,507,006

[45] Date of Patent: Apr. 9, 1996

[54] CELLULAR RADIO SYSTEM FOR TRANSMISSION OF SIGNALLING INFORMATION ON THE BASIS OF ITS URGENCY OR DURING TEMPORARY CESSATION OF COMMUNICATION

[76] Inventor: Phillip Knight, 12 Hinchley Way, Hinchley Wood, Esher KT10 OBD, England

[21] Appl. No.: 291,471

[22] Filed: Aug. 17, 1994

(Under 37 CFR 1.47)

Related U.S. Application Data

[63] Continuation of Ser. No. 861,389, Mar. 31, 1992, abandoned, which is a continuation of PCT/GB90/01183 Jul. 31, 1990.

[30] Foreign Application Priority Data

Jul. 31, 1989 [GB] United Kingdom ............... 8917452

[51] Int. Cl.$^6$ ................. H04Q 7/20; H04B 7/00
[52] U.S. Cl. .............. 455/33.1; 455/54.1; 455/56.1; 379/59; 379/63; 370/111
[58] Field of Search ............... 370/79–81, 110.1–110.4, 370/111, 118; 455/58.1–58.2, 54.1–54.2, 68, 69, 33.1, 229

[56] References Cited

U.S. PATENT DOCUMENTS

| | | | |
|---|---|---|---|
| 4,313,197 | 1/1982 | Maxemchuk | 370/111 |
| 4,330,858 | 5/1982 | Choquet | 370/110 |
| 4,394,760 | 7/1983 | Kammerlander | 370/111 |
| 4,495,620 | 1/1985 | Steele | 370/110.4 |
| 4,630,261 | 12/1986 | Irvin | 370/81 |
| 5,095,540 | 3/1992 | Reed | 370/111 |
| 5,121,385 | 6/1992 | Tominaga et al. | 370/80 |

FOREIGN PATENT DOCUMENTS

| | | |
|---|---|---|
| 0037071 | 10/1981 | European Pat. Off. . |
| 0171596 | 2/1986 | European Pat. Off. . |

OTHER PUBLICATIONS

The Transactions of the IECE of Japan, vol. E–68, No. 1, Jan., 1985, pp. 22–28 Seguel, "Voice–Data Hybrid Transmission Systems in 64kbit/sec Digital Lines".

Electronics Letters, No. 11, May 1988, Stevanage (GB), pp. 670–672; Wong et al; "Blank and Burst Transmission of Data Over Active Speech Channels".

38th IEEE Vehicular Technology Conference, Jun. 1988, Philadelphia, PA, pp. 30–37; Fuhrman; "Radio Access Protocol of the New GSM Land Mobile Communication Standard".

38th IEEE Vehicular Technology Conf., Jun. 1988, Philadelphia, PA, pp. 57–64; Stern; "Design Issues Relevant to Developing . . . Integrated Voice/Data Mobile Radio System".

*Primary Examiner*—Edward F. Urban
*Assistant Examiner*—Lisa Charouel
*Attorney, Agent, or Firm*—Nixon & Vanderhye

[57] ABSTRACT

A cellular radio system has a plurality of base stations (BS) each for communicating with mobile stations (MS) in its vicinity, and each base station (BS) determines that voice or data communication between the base station and the mobile station has temporarily ceased, and initiates required signalling with the mobile station during that temporary cessation.

11 Claims, 4 Drawing Sheets

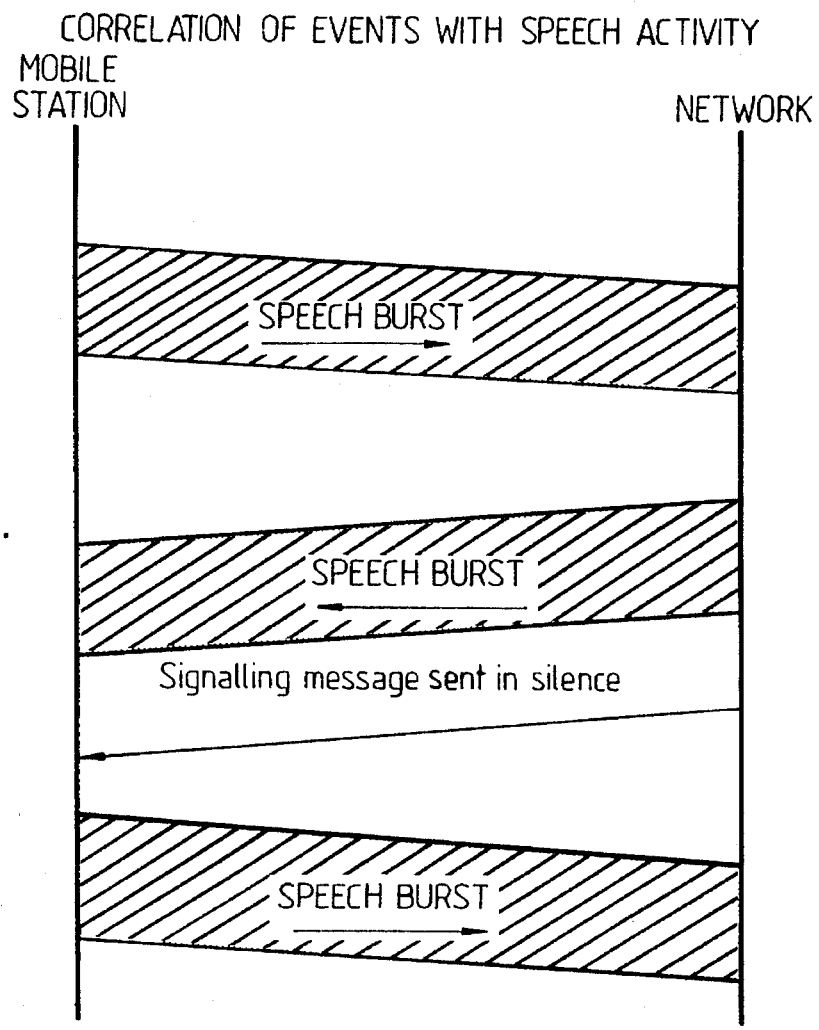
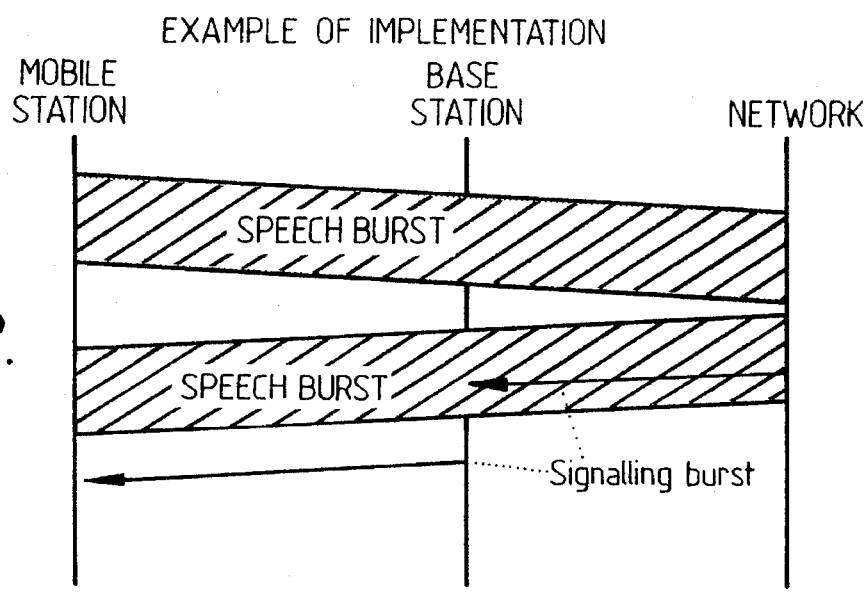

CELLULAR RADIO SYSTEM FOR TRANSMISSION OF SIGNALLING INFORMATION ON THE BASIS OF ITS URGENCY OR DURING TEMPORARY CESSATION OF COMMUNICATION

This is a continuation of application Ser. No. 07/861,389, filed Mar. 31, 1992, now abandoned, which is a continuation PCT application Ser. No. PCT/GB90/01183, filed Jul. 31, 1990.

The present invention relates to a cellular radio system.

It is well known that in a cellular radio system, bi-directional voice or data communication can take place between one of a number of fixed base stations and one or more mobile stations, within an area or cell served by that base station. When a mobile moves between adjacent cells, it is possible to handover or handoff a call from the current base station to the base station of the adjacent cell. A group of base stations are connected to a common mobile switching center, which oversees handover. In handover, the current base station and the mobile need to exchange signalling information. This control signalling is necessarily concentrated into a short period of time, and because the voice or data transmission may need to be interrupted, albeit briefly, a user may perceive a deterioration in call quality. Other control signalling e.g. power control, takes place between a mobile and a base station throughout a call.

As more complex, digital, cellular radio systems, for example the Pan-European GSM system, are developed, the amount of control or background signalling required increases. This is because the overall aim is to improve the quality of the communication link and, in the case of voice telephony, this means the perceived quality of a telephone call to a user. As has already been pointed out, such background signalling can have exactly the opposite effect and reduce the perceived quality of a call.

The present invention seeks to provide a cellular radio system in which the disruption caused by signalling is alleviated.

A cellular radio system having a plurality of base stations each for communicating with mobile stations in its vicinity, characterised by a base station having means for determining that voice or data communication between the base station and the mobile station has temporarily ceased, means for assessing the urgency of required signalling information, means for storing the required signalling information while voice or data communication continues, and means responsive to the determining means and the assessment means for initiating transmission of the stored required signalling information to the mobile station on the basis of the assessed urgency of the information, or during a determined temporary cessation in the voice or data communication if the required signal information has not been transmitted earlier on the basis of the assessed urgency of the signalling information.

According to another aspect the invention provides a cellular radio system for connection to a telephone network comprising: a plurality of base stations, and at least one mobile switching center to which the base stations are connected, so that a mobile station can make a call to the network via one of the base stations and the mobile switching center, characterized in that at least one of the base stations has means for assessing the urgency of a signalling message sent from the mobile switching centre for a mobile station during a call, means for storing the signalling message, means for assessing the state of communication with the mobile station to be signalled, and means for forwarding the stored signalling message on the basis of the assessed urgency from the base station to the mobile station or during an assessed period of silence in the call if the signal message has not been sent earlier on the basis of the assessed urgency of the signalling message.

Preferably the base station has timing means for initiating transmission of a signalling message to a mobile station a predetermined period after receipt of the message by the base station.

Preferably the means for assessing urgency has means for assessing a priority code contained in the signalling message.

Preferably the means for assessing urgency has means for interpreting the signalling message to assess the intended function of the message, so that the urgency of the message may be determined.

According to a further aspect the invention provides, a method of signalling in a cellular radio system comprising: assessing the urgency of required signalling information; holding required signalling information while voice or data communication continues; determining that voice or data communication between the base station and the mobile station has temporarily ceased; and initiating required signalling with the mobile station during a determined temporary cessation in the voice or data communication, unless the required signalling information has been sent earlier on the basis of the assessed urgency of the required signalling information.

The present invention makes use of the gaps or quiet periods in telephone calls to initiate signalling between a base station and a mobile station.

A preferred embodiment of the invention will now be described by way of example, and with reference to the accompanying drawings wherein:

FIG. 2 illustrates the principle of operation of a preferred embodiment of the invention;

FIG. 3 illustrates the time of signalling in a cellular system in conjunction with a fixed network;

Figure 1:
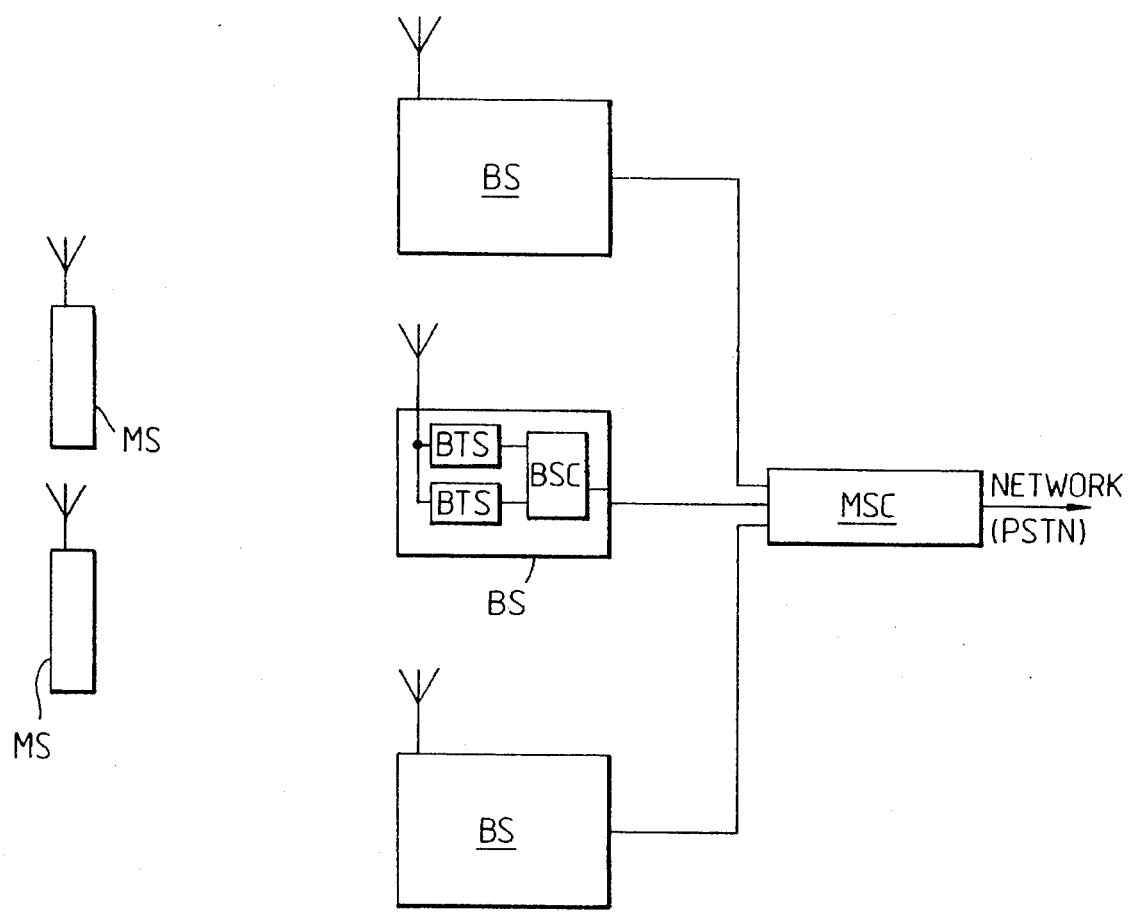
FIG. 1 is a block schematic diagram showing in general terms the major parts of a cellular radio system.

Referring to FIG. 1, the components of a cellular radio system generally include, on the one hand, a number of mobile stations (MS) and, on the other hand, a number of base stations (BS) connected to one or more mobile switching centers (MSC) which are connected to a network, for example a PSTN. In the example shown, which relates to a cellular system to the GSM standard, the base stations BS each have a number of base transceiver stations (BTS) connected to a common base site controller (BSC) which interfaces with the mobile switching center(s) MSC. A more detailed description of the radio link (BS-MS) (GSM Air interface) and fixed (MSC-BS) interface (GSM interface "A") will be found in GSM recommendations. Such a cellular radio system is well known and will not be described in further detail.

Generally speaking, the base site controller (BSC) has functionality which controls the radio resources at detailed level. Specifically for present purposes, the base site controller, BSC:

- receives and transmits signalling messages from and to the mobile station MS via the BTS across the air interface and to and from the mobile switching MSC;
- interprets those signalling messages which are concerned with radio resourse management, one of which is the handover command; and performs the necessary transcoding function between the air interface coding algorithm for speech and the "A" law coding defined for the "A" interface.

Referring to FIG. 2, in a telephone conversation, speech occurs in bursts, with short periods of silence between them. The general principle of the preferred embodiment as to inject signalling between the base and mobile stations into the periods between bursts of speech in a call. In this way, the signalling has a reduced effect on the perceived quality of a call.

FIG. 3 illustrates in schematic terms the implementation of the general principle of the preferred embodiment. The base stations relay not only speech bursts from the network to the mobile stations, but also relay signalling information in signalling bursts. As will be seen in FIG. 3, the signalling burst may come to the base station at the same time as a speech burst. The base station retrieves the signalling burst and queues the signalling burst until there is a period of silence, i.e. between speech bursts, in which transmission of the signalling burst can begin. It may be that the signalling information needs to be transmitted from the base to the mobile within a certain period, even if there is no gap in the speech—for example, if the call is about to fail and handover is necessary. It may therefore be appropriate to have a timed control of the transmission of the signalling bursts in such circumstances. An example algorithm for this procedure is shown in FIG. 4.

Figure 4:
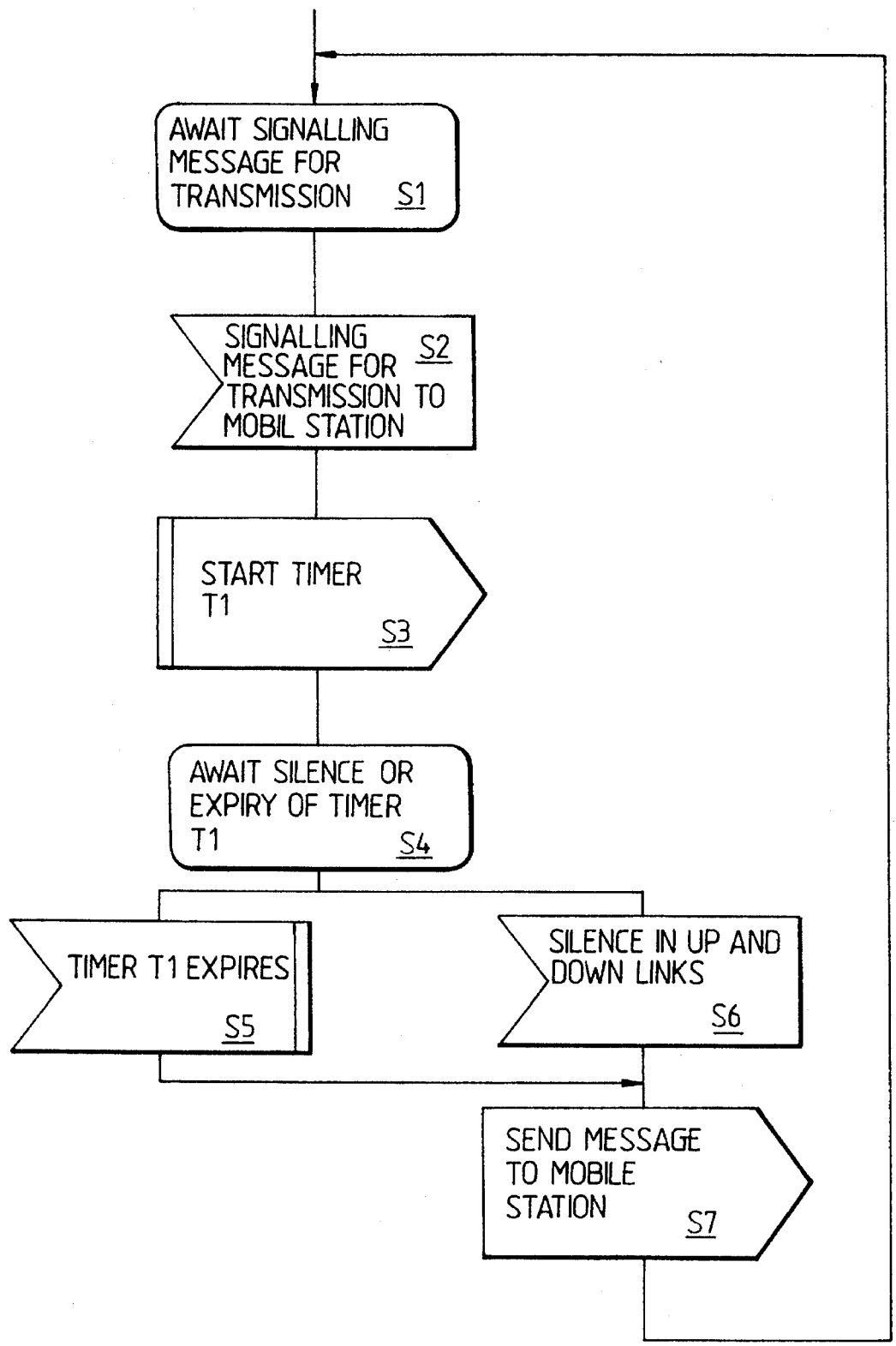
FIG. 4 is an algorithm for the procedures for implementing the preferred embodiment of the invention.

Referring to FIG. 4, in an initial state with mobile station supported on a traffic channel, the base site controller system is waiting, step S1, for a signalling burst for a mobile to arrive from the network. At some time a signalling message arrives, step S2. At this stage, a timer T1 is started, step S3. The control system then awaits, step S4, a period of silence, i.e. between speech bursts, or expiry of timer T1. Upon either the expiry of timer T1, step S5, or a period of silence in the up and down links, step S6, the signalling message is sent to the mobile, step S7. Thereafter, the control system re-initiates the procedure from step S1. A number of signalling messages could be stored with separate timers operating for each, or one or more timer(s) for a group or groups of messages.

The type and content of the signalling message being handled by the base site controller may affect the described procedure. For example, if the signaling message is a handover command, the base site controller may need to assess whether the message needs to be transmitted immediately to avoid call failure, delayed until a gap in speech occurs, or delayed for a limited period of time—c.f. procedure of FIG. 4. Provided the base site controller is furnished with appropriate information, such a decision can properly be taken.

Figure 5:
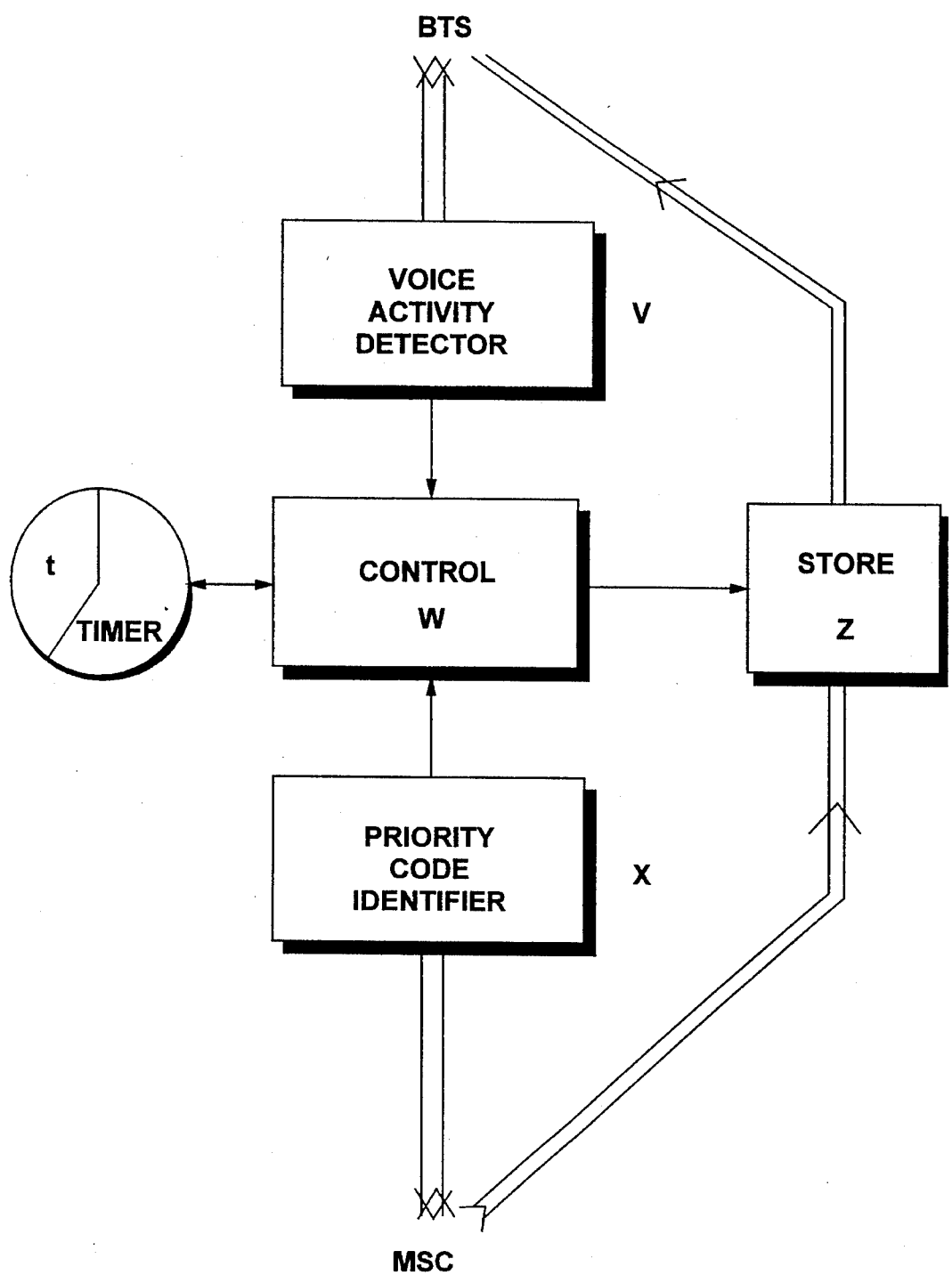
FIG. 5 is a diagrammatic view of the functions performed by the base site controller.

As indicated previously, the base site controller (BSC) has functionality which controls the radio resources at a detailed level. The block diagram of FIG. 5 illustrates the relationship between various elements of the base site controller which perform those functions. In the block diagram of FIG. 5, control signals are indicated by the single solid line, while speech/data signals are indicated by the double solid lines. Thus, signals coming from the mobile switching center (MSC) are monitored by a priority code identifier X. The identification of such signals is reported to the controller W, which causes the signal to be stored in store Z. This also causes the control center to start a timer T. Timer T counts out a preset time interval, after which it sends a signal to the control center W, which causes the message stored in store Z to be transmitted. The voice channel is monitored by voice activity detector V and any absence of voice activity is signalled to the control center W, which causes the message stored in the store Z to be injected into the radio channel, if timer T has not first counted out its preset time interval. The preset time interval is determined according to the priority code. For very high priority signals, the time interval is zero, in which case the signal passes straight through store Z.

I claim:

1. A cellular radio system having a plurality of base stations for communicating with mobile stations in vicinities of the base stations characterized by at least one of said plurality of base stations having means for determining that voice or data communication between said at least one of said plurality of base stations and one of said mobile stations has temporarily ceased, means for establishing a predetermined time period, the time period being related to the urgency of required signalling information, means for storing the required signalling information while the voice or the data communication continues, and means, responsive to the determining means and the establishing means, for initiating transmission of the stored required signalling information to the one of said mobile stations upon expiration of the predetermined time period, or during a determined temporary cessation in the voice or the data communication if such cessation occurs before the expiration of said predetermined time period.

2. A cellular radio system as claimed in claim 1 wherein said predetermined time period is established upon receipt of said required signalling information at said at least one of said plurality of base stations.

3. A cellular radio system as claimed in claim 1 wherein the establishing means has means for assessing a priority code contained in said signalling information.

4. A cellular radio system as claimed in claim 1, wherein the establishing means has means for interpreting the signalling information to assess the intended function of the information, so that the urgency of the information may be determined.

5. A cellular radio system for connection to a telephone network comprising: a plurality of base stations (BS), and at least one mobile switching center (MSC) to which the base stations are connected, so that at least one mobile station (MS) can make a call to the network via a base station (BS) and the mobile switching center (MSC), characterized in that at least one of the base stations (BS) has means for establishing a predetermined time period, said predetermined time period being related to the urgency of a signalling message, means for storing the signalling message, means for assessing the presence or absence of communication with the at least one mobile station to be signalled, and means for forwarding the stored signalling message upon expiration of the predetermined time period from the said at least one base station to the said at least one mobile station or during an assessed period of absence of communication during the call if such absence of communication occurs before the expiration of the predetermined time period.

6. A cellular radio system as claimed in claim 5 wherein said predetermined time period is established after receipt of said signalling message by said at least one base station.

7. A cellular radio system as claimed in claim 5, wherein the establishing means has means for assessing a priority code contained in the signalling message.

8. A cellular radio system as claimed in claim 5 where in the establishing means has means for interpreting the signalling message to assess the intended function of the message, so that the urgency of the message may be determined.

9. A method of signalling in a cellular radio system comprising the steps: establishing a predetermined time period wherein the predetermined time period is determined as a function of the urgency of the required signalling information; holding the required signalling information while voice or data communication continues; determining that the voice or the data communication between a base station and a mobile station has temporarily ceased; and initiating transmission of the required signalling information to the mobile station during a determined temporary cessation in the voice or the data communication, unless the required signalling information has been sent earlier, upon expiration of the predetermined time period.

10. A method of signalling in a cellular radio system as in claim 9, wherein the predetermined time period is determined in accordance with a priority code included in the required signalling information.

11. A method of signalling in a cellular radio system as in claim 9, wherein the predetermined time period is determined in accordance with an analysis of the informational content of the required signalling information.

* * * * *